United States Patent Office 3,492,285

Patented Jan. 27, 1970

1

3,492,285

MONOAZO DYESTUFFS CONTAINING A 4-ORGANOAMINO - METHYLENE - 1 - HYDROXYNAPHTHALENE-2-CARBOXYLIC ACID GROUP

Heinz Machatzke, Leverkusen, Germany, assignor to Farbenfabriken Bayer Aktiengesellschaft, Leverkusen, Germany, a corporation of Germany No Drawing. Filed July 11, 1966, Ser. No. 563,957
Claims priority, application Germany, July 15, 1965, F 46,602; Apr. 6, 1966, F 48,880
Int. Cl. C07c *107/08*
U.S. Cl. 260—151 10 Claims

ABSTRACT OF THE DISCLOSURE

Azo dyestuffs, which dyestuffs are used for dyeing and printing wool, silk or superpolyamide fibers with good fastness to washing, and the 2:1 metal, e.g. Cr, Co, Ni, complexes thereof, of the formula

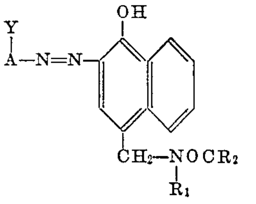

in which A is a radical of the benzene or naphthalene series in which Y is ortho to the azo group; Y is a metal complex forming group, e.g. OH; $R_1$ is H or lower alkyl; $R_2$ is substituted or unsubstituted alkyl, alkenyl, aryl, alkoxy, amino, monalkylamino, dialkyl amino, or phenylamino; are prepared by coupling a diazo compound containing the Y—A—residue with a coupling compound corresponding to the remainder of the dyestuff molecule and optionally metallizing the dyestuff.

The present invention relates to new azo dyestuffs of the formula

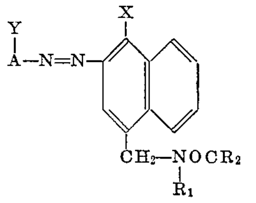

(I)

and metal complex compounds thereof. In Formula I, A means a radical of the benzene or naphthalene series in which Y is in the o-position to the azo group, Y is a metal complex-forming grouping, X an OH group, $R_1$ stands for hydrogen or a lower alkyl radical, and $R_2$ is an alkyl, alkenyl, aryl, alkoxy, amino, monoalkylamino, dialkylamino or phenylamino radical which may be substituted.

As metal complex compounds of the dyestuffs (I) the chromium, cobalt, copper and nickel complexes are of special interest.

Examples for metal complex-forming groups Y are —OH, —COOH, $—OCH_3$ and $—OC_2H_5$.

The new azo dyestuffs are obtained in that the diazo compound of an amine of the formula

(II)

in which the groups —Y and $—NH_2$ in the radical A

2 stand in the o-position to each other, is coupled with a compound of the general Formula III or IV

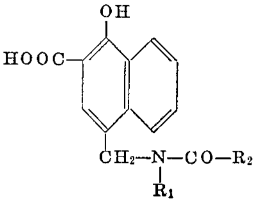

(III)

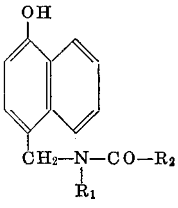

(IV)

and the dyestuff thus obtained is optionally metallised; in the Formulae II, III and IV, A, Y, $R_1$ and $R_2$ have the same meaning as above. If using the components (III) the coupling reaction takes place with the exchange of the —COOH group in the β-position of the coupling component (III) for the azo group.

To produce 1:2 chromium or 1:2 cobalt complex dyestuffs, i.e. those dyestuffs which contain for each atom of chromium or cobalt about two molecules of the dyestuff in complex linkage, two identical or two different dyestuffs of the Formula I can be employed, or a dyestuff (I) and any other metallisable azo dyestuff. Chroming or cobalting is preferably effected by known methods in a weakly acid, neutral or alkaline medium with the use of approximately 0.5 mol of the heavy metal compound for each mol of the metallisable azo dyestuff.

To produce uniform 1:2 mixed chromium complex dyestuffs the process may be carried out in such a way that first one mol of a metallisable azo dyestuff (I) and one gram atom of a chromium-III-salt are heated in an acid medium until the 1:1 chromium complex is formed, which is then reacted with one mol of another metallisable azo dyestuff of the Formula I or with another metallisable azo dyestuff, e.g. a dyestuff which is different from (I), of the general formula

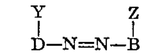

(V)

wherein D means a radical of the benzene or naphthalene series in which Y is in the o-position to the azo group, B represents the radical of a coupling component which contains Z linked in the o-position to the azo group, Y stands for a metal complex-forming grouping, and Z for an —OH, $—NH_2$ or —NH-alkyl group.

Diazo components

suitable for the synthesis of the new dyestuffs, are the following compounds inter alia: 2-aminophenols, such as 2-aminophenol, 2-amino-4-chlorophenol,
2-amino-4,6-dichlorophenol, 2-amino-4-nitrophenol,
2-amino-4,6-dinitrophenol, 2-amino-4-chloro-6-nitrophenol,
2-aminophenol-4-(or 5-) sulphonic acid,
2-aminophenol-4-(or 5-)-sulphaonamide,
2-aminophenol-4-ethylsulphone,
2-aminophenol 5-methylsulphone,
2-aminophenol-4-(2′-hydroxyethyl)-sulphonamide,
2-aminophenol-4(or 5-)-dimethylsulphonamide,
4-chloro-2-aminophenol-5-sulphonamide,
4-methoxy-2-aminophenol-5-sulphonamide,
5-nitro-2-aminophenol-4-sulphonamide,
4-nitro-2-aminophenol-6-sulphonamide,
4-methoxy-2-aminophenol,
4-chloro-5-nitro-2-aminophenol,
5-nitro-2-aminophenol,
6-nitro-4-methyl-2-aminophenol,
3-amino-4-hydroxybenzene-2-methylenesulphone-1-ether, 2-aminobenzoic acid, 2-amino-4-sulphonamido-benzoic acid,
2-amino-5-sulphonamindobenzoic acid,
2-methoxy-1-aminobenzene,
2,4-dimethoxy-1-aminobenzene,
2-methoxy-4-chloro-1-aminobenzene, or
6-nitro-2-hydroxy-1-aminonaphthalene-4-sulphonic acid.

The following compounds are suitable coupling components (III) and (IV), for example:

4-chloroacetylaminomethylene-1-hydroxynaphthalene-2-carboxylic acid,
4-chloropropionylaminomethylene-1-hydroxynaphthalene-2-carboxylic acid,
4-(N-methyl-N-chloroacetylamino)-methylene-1-hydroxynaphthalene-2-carboxylic acid,
4-acetylaminomethylene-1-hydroxynaphthalene-2-carboxylic acid,
4-propionylaminomethylene-1-hydroxynaphthalene-2-carboxylic acid,
4-(N-methyl-N-acetylamino)-methylene-1-hydroxynaphthalene-2-carboxylic acid,
4-(N-methyl-N-benzoylamino)-methylene-1-hydroxynaphthalene-2-carboxylic acid,
4-dichloroacetylaminomethylene-1-hydroxynaphthalene-2-carboxylic acid,
4-trichloroacetylaminomethylene-1-hydroxynaphthalene-2-carboxylic acid,
4-acryloylamino-methylene-1-hydroxynaphthalene-2-carboxylic acid,
4-chloroacryloylaminomethylene-1-hydroxynaphthalene-2-carboxylic acid,
4-trichloroacryloylaminomethylene-1-hydroxynaphthalene-2-carboxylic acid,
4-methcaryloylaminomethylene-1-hydroxynaphthalene-2-carboxylic acid,
4-butyrylaminomethylene-1-hydroxynaphthalene-2-carboxylic acid,
4-crotylaminomethylene-1-hydroxynaphthalene-2-carboxylic acid,
4-γ-chlorocrotylaminomethylene-1-hydroxynaphthalene-2-carboxylic acid,
4-vinylacetylaminomethylene-1-hydroxynaphthalene-2-carboxylic acid,
4-methylsulphonyl-hydroxyacetylaminomethylene-1-hydroxynaphthalene-2-carboxylic acid,
4-methylsulphonyl-β-hydroxypropionylamino-methylene-1-hydroxynaphthalene-2-carboxylic acid,
4-β-methylsulphonyl-propionylaminomethylene-1-hydroxynaphthalene-2-carboxylic acid,
4-β-phenylsulphonylpropionylaminomethylene-1-hydroxynaphthalene-2-carboxylic acid,
4-benzoylaminomethylene-1-hydroxynaphthalene-2-carboxylic acid,
4-p-bromomethyl-benzoylaminomethylene-1-hydroxynaphthalene-2-carboxylic acid,
4-p-chloromethyl-benzoylaminomethylene-1-hydroxynaphthalene-2-carboxylic acid or the aforementioned compounds being free of the 2-positioned carboxylic acid group according to Formula IV.

The coupling components (III) are obtained, for example, by reacting methylolamides or their methyl or ethyl ethers with 1-hydroxynaphthalene-2-carboxylic acid in the presence of strongly acidic condensing agents, e.g. 80–100% sulphuric acid, mixtures of glacial acetic acid and hydrochloric acid or alcoholic hydrogen chloride.

The coupling components (IV) are obtainable, for example, by heating components of the Formula III in mineral acid medium with the addition of hydrogensulphate whereupon the 2-standing carboxylic acid group is split off.

The new dyestuffs, in the form of their metal complex compounds, are eminently suitable for the dyeing and printing of natural or regenerated protein fibres, such as wool, silk, as well as for the dyeing and printing of synthetic fibres, such as superpolyamide fibres. When used as metal-free dyestuffs they can be after-treated on the fibre or in the dye-bath with metal-yielding agents.

In the following examples, which are given for the purpose of illustrating the invention, the parts are parts by weight; the temperatures are given in degree centigrade.

EXAMPLE 1

45 parts 4-chloroacetylamino-methylene-1-hydroxynaphthalene-2-carboxylic acid are dissolved in 500 parts water by the addition of a 20% sodium hydroxide solution. The product is cooled to 0° by the addition of 400 parts ice and the diazonium salt suspension, prepared by the diazotisation of 23 parts 4-nitro-2-aminophenol in 300 parts water, is allowed to run in. During coupling, a pH value of 13–14 is maintained by the addition of a concentrated sodium hydroxide solution. After one hour the precipitated dyestuff is filtered off with suction and washed with water.

The dyestuff paste obtained is added at 80–90° to a solution of 21 parts cobalt-II-sulphate, and 16 parts sodium acetate in 350 parts water and 120 parts formamide. The reaction mixture is stirred at 80° for 2 hours, then allowed to cool and filtered off with suction. The dyestuff paste is suspended in 1000 parts water, heated at 80–90° for 30 minutes and filtered off with suction. The dyestuff paste is subsequently dried at 60–70° in a vacuum. 60 parts of the metal complex dyestuff of the structure

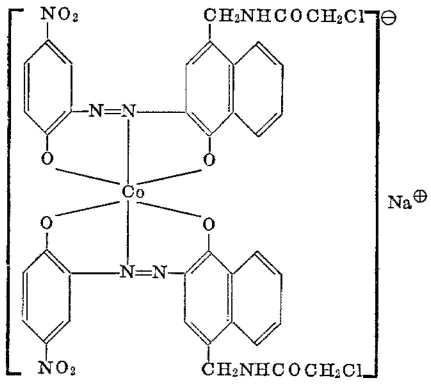

are obtained, which dyes polyamide fibres in garnet shades.

EXAMPLE 2

45 parts 4-chloroacetylamino-methylene-1-hydroxynaphthalene-2-carboxylic acid are dissolved in 500 parts water by the addition of a 20% sodium hydroxide solution. The solution is cooled to 0° by the addition of 400 parts ice and a diazonium salt solution, which was prepared by the diazotisation of 19.3 parts 4-chloro-2-aminophenol in 300 parts water, is allowed to run in. A pH value of 13–14 is maintained during the coupling by the addition of a concentrated sodium hydroxide solution. The precipitated dyestuff is filtered off with suction after one hour and then washed with water. The dyestuff paste is dissolved at 100° in 30 parts formamide and 11 parts potassium dichromate are added. After five hours, the mixture is poured into 2000 parts water containing 200 parts sodium chloride previously dissolved, the precipitated dyestuff is filtered off with suction and dried at 60–70°. 48 parts of the metal complex dyestuff of the formula

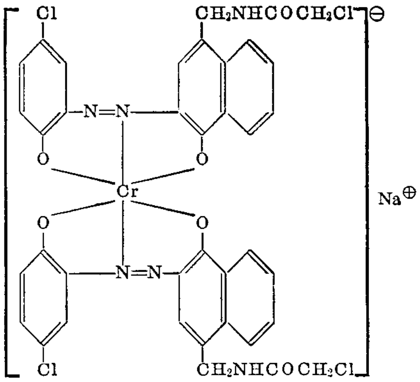

are obtained, which dyes polyamide fibers in navy blue shades of excellent fastness properties.

When the procedure is followed as described in Examples 1 and 2 and, instead of the diazo and coupling components there mentioned, the components set out in Table I are used, followed by cobalting or chroming the dyestuffs obtained, further dyestuffs with very good fastness to light and wet processing are obtained which dye polyamide and protein fibres in the indicated shades.

EXAMPLE 3

10 parts of the dyestuff which can be obtained according to Example 1 are ground with 10 parts of a naphthalene/formaldehyde condensation product and stirred into 10,000 parts water at pH 6. 10 parts of a levelling agent, e.g. an alkylphenyl-polyglycol ether, are added. 1000 parts of a fabric of synthetic polyamide fibres are introduced into this dyebath and the temperature is slowly raised to 100°. After dyeing at this temperature for 1 hour, the fibre material is rinsed, washed and dried. A garnet coloured dyeing with very good fastness to light and wet processing is obtained.

EXAMPLE 14

10 parts of the dyestuff which can be obtained according to Example 1 are ground with 10 parts of a naphthalene/formaldehyde condensation product and stirred into 10,000 parts water at pH 5. 10 parts of a levelling agent, e.g. an alkylphenyl-ployglycol ether, are added. 1000 parts of a hank of wool are introduced into this dyebath and the temperature is slowly raised to 100°. After dyeing at this temperature for 1 hour, the fibre material is rinsed, washed and dried. A garnet coloured dyeing with very good fastness to light and wet processing is obtained.

TABLE I

| | | Coupling component 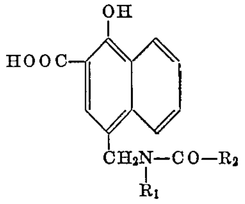 | | |
|---|---|---|---|---|
| Diazo component | Metal | $R_1$= | $R_2$= | Shade |
| 4-nitro-2-aminophenol | Co | H | $CH_3$ | Garnet. |
| Do | Co | H | $C_6H_5$ | Do. |
| Do | Co | $CH_3$ | $C_6H_5$ | Do. |
| Do | Cr | H | $CH_2Cl$ | Currant. |
| Do | Cr | H | $CH_2CH_2Cl$ | Do. |
| 4-chloro-2-aminophenol | Co | H | $CH_2Cl$ | Bordeaux. |
| Do | Co | H | $CH_3$ | Do. |
| Do | Co | H | $CH_2CH_2Cl$ | Do. |
| 4,6-dinitro-2-aminophenol | Cr | H | $CH_2Cl$ | Grey. |
| Do | Cr | H | $C_6H_5$ | Do. |
| 2-aminophenol-4-sulphonamide | Cr | H | $CH_2Cl$ | Currant. |
| Do | Co | H | $CH_2Cl$ | Bordeaux. |
| 2-aminophenol-4-ethylsulphon | Co | H | $CH_2Cl$ | Do. |
| 6-chloro-4-nitro-2-aminophenol | Cr | H | $CH_2Cl$ | Currant. |
| Do | Co | H | $CH_2Cl$ | Red-violet-brown. |
| 2-aminophenol | Co | H | $CH_2Cl$ | Bordeaux. |
| Do | Cr | H | $CH_2Cl$ | Currant. |
| 2-aminophenol-4-sulphonic acid | Co | H | $CH_2Cl$ | Bordeaux. |
| 4-chloro-2-aminophenol | Cr | H | $CH_3$ | Blue-violet. |
| Do | Cr | H | $C_2H_5$ | Do. |
| Do | Cr | H | $C_6H_5$ | Do. |
| Do | Cr | $CH_3$ | $C_6H_5$ | Do. |
| Do | Cr | H | $-C(CH_3)=CH_2$ | Do. |
| Do | Cr | H | $-CH=CH_2$ | Do. |
| Do | Cr | H | $-CH_2CH_2Cl$ | Do. |
| Do | Co | H | $NH_2$ | Bordeaux. |
| Do | Co | H | $NHCH_3$ | Do. |
| Do | Cr | H | $-NHC_4H_9$ | Blue-violet. |
| Do | Cr | H | $-N(CH_3)_2$ | Do. |
| Do | Cr | H | $-OC_2H_5$ | Do. |
| Do | Cr | H | $-OCH_3$ | Do. |
| 4,6-dichloro-2-aminophenol | Cr | H | $-CH_2Cl$ | Grey-violet. |
| Do | Co | H | $-CH_2Cl$ | Red-violet. |
| Do | Co | H | $-NH-C_6H_5$ | Do. |
| 5-nitro-2-aminophenol | Co | H | $CH_2Cl$ | Navy-blue. |
| Do | Cr | H | $CH_2Cl$ | Blue. |
| 2-aminophenol-4-methylsulphonamide | Co | H | $CH_2Cl$ | Bordeaux. |
| Do | Cr | H | $CH_2Cl$ | Currant. |
| 2-aminophenol-4-(2'-hydroxyethyl)-sulphonamide. | Co | H | $CH_2Cl$ | Bordeaux. |
| 4-chloro-5-nitro-2-aminophenol | Co | H | $CH_2Cl$ | Blue. |
| Do | Cr | H | $CH_2Cl$ | Blue-violet. |
| 4-chloro-6-nitro-2-aminophenol | Co | H | $CH_2Cl$ | Currant. |
| Do | Cr | H | $CH_2Cl$ | Grey-blue. |
| 6-nitro-2-hydroxy-1-aminonaphthalene-4-sulphonic acid. | Cr | H | $CH_2Cl$ | Black-grey. |
| 4,6-dinitro-2-aminophenol | Co | H | $CH_2Cl$ | Brown. |

EXAMPLE 5

141 parts of a 20% paste of 4-chloroacetylamino-methylene - 1 - hydroxynaphthalene - 2 - carboxylic acid are slurried in 1000 parts of water and 50 parts of a 15% solution of sodium hydrogen sulphite added. Hydrochloric acid is added subsequently until a pH of 2 to 6 is reached and the mixture then heated with stirring to the boil for 4 to 5 hours. After this time 4-chloroacetylaminomethylene - 1 - hydroxynaphthalene has precipitated as a half solid mass at the bottom of the vessel. The mixture is cooled down to 0 to 10° C., the precipitated product dissolved with 10 parts of concentrated soda-lye, 40 parts of sodium carbonate added and a diazo suspension prepared from 15.4 parts of 5-nitro-2-amino-phenol added dropwise within 10 minutes; the mixture is stirred for 5 hours at 0 to 10° C. It is then acidified with dilute hydrochloric acid and the precipitated dyestuff filtered with suction. The dyestuff paste is suspended in 1000 parts of water at pH 8 to 9, warmed to 50 to 70° C. and a solution of 22 parts of cobalt sulphate and 5 parts of tartaric acid in 100 parts of water added dropwise within 20 minutes while keeping the pH at 8 to 9 by adding dropwise sodium hydroxide. After further stirring for 4 hours at 50 to 70° C. the precipitated cobalt containing dyestuff is filtered hot with suction. After drying one obtains 43 parts of the cobalt complex dyestuff of the formula

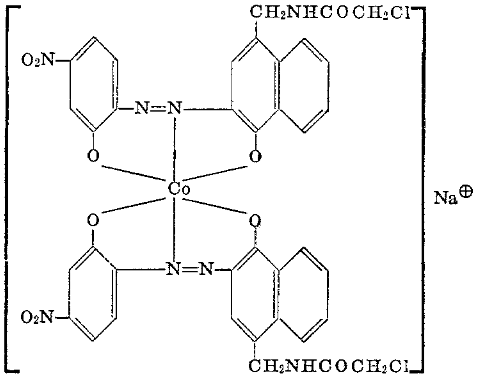

which dyes synthetic superpolyamide fibres and wool navy blue shades.

EXAMPLE 6

28 parts of 4 - chloroacetylaminomethylene - 1 - hydroxynaphthalene are dissolved in 500 parts of water together with 10 parts of 20% soda-lye at 0 to 5° C. 40 parts of sodium carbonate are added and subsequently a diazo suspension obtained by diazotisation of 10.9 parts of 2 - aminophenol with nitric acid is added within 10 minutes. The reaction mixture is stirred at pH 7 to 9 for 4 hours, acidified with dilute hydrochloric acid and the dyestuff filtered with suction. After drying one obtains 33 parts of the dyestuff of the formula

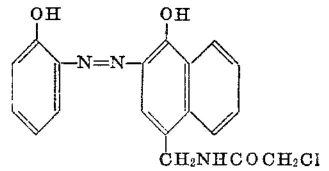

EXAMPLE 7

48 parts of the 1:1 chromium complex of the dyestuff 4 - nitro - 2 - aminophenol→1 - phenyl - 3 - methyl-pyrazolone - 5 are dissolved together with 50 parts of the dyestuff 2 - aminophenol→4 - chloroacetylamino-methylene - 1 - hydroxynaphthalene, obtained according to Example 6, in 300 parts of ethylene glycol. The mixture is heated to 90 to 110° C., 150 ml. of formamide added and stirring continued for further 40 minutes. The reaction mixture is then poured into 3000 parts of water, acidified with dilute hydrochloric acid and filtered with suction. After drying one obtains 80 parts of the 2:1 chromium complex compound of the formula

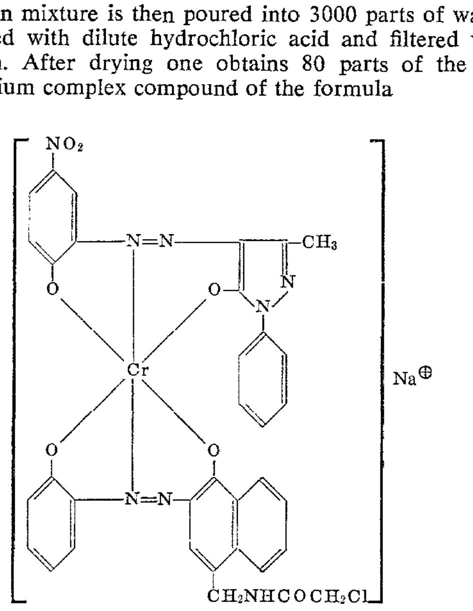

which dyes synthetic superpolyamide fibres and wool brown shades.

EXAMPLE 8

A mixture of 53 parts of the azo dyestuff 5-nitro-2-aminophenol→4 - chloroacetylaminomethylene - 1 - hydroxynaphthalene and 53 parts of the dyestuff 4 - nitro-2 - aminophenol→4 - chloroacetylaminomethylene - 1-hydroxynaphthalene is dissolved in 500 parts of formamide and 200 parts of water, heated to 90 to 100° C. and treated with 60 parts of chromium-(III)-chloride hydrate. The reaction mixture is stirred for 2 to 4 hours and then poured into 3000 parts of water. The precipitated dyestuff is filtered with suction, several times washed with water and dried. One obtains 96 parts of the 2:1 chromium mixed complex dyestuff which dyes wool and synthetic superpolyamide fibres grey to black shades.

EXAMPLE 9

28 parts of 4 - chloroacetylaminomethylene-1-hydroxy-naphthalene are dissolved in 400 parts of water and 10 parts of 20% soda-lye. 40 parts of sodium carbonate and a diazo suspension obtained by diazotization of 13.7 parts of 2-aminobenzoic acid with nitric acid are added within 10 minutes. The reaction mixture is then stirred at pH 8 to 9 for 4 hours, acidified with dilute hydrochloric acid, the dyestuff obtained filtered with suction and dried. One obtains 40 parts of the dyestuff of the formula

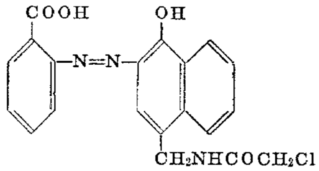

The dyestuff dyes synthetic superpolyamide fibres yellowish red shades with good fastness to washing.

EXAMPLE 10

24.6 parts of 4 - ureidomethylene - 1 - hydroxynaphthalene are dissolved in 300 parts of water with 10 parts of 20% soda-lye, 40 parts of sodium carbonate and a diazo suspension obtained by diazotization of 16 parts of 5 - chloro - 2 - amino - 1 - methoxybenzene added within 15 minutes and the reaction mixture stirred for further 4 hours at pH 7 to 9. The mixture is then acidified with hydrochloric acid, the dyestuff precipitated filtered with suction and dried. One obtains 35 parts of the dyestuff of the formula

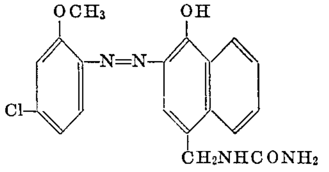

which dyes synthetic superpolyamide fibres red shades with good fastness to washing.

I claim:

1. An azo dyestuff of the formula

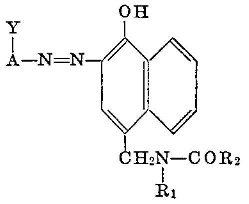

wherein A is unsubstituted or substituted benzene or naphthalene carrying the azo group and Y in o-position to each other said substituents being selected from the group consisting of chloro, nitro, sulphonic acid, sulphonamide, ethyl sulphone, methyl sulphone, hydroxyethyl, dimethylsulphonamide, methoxy methyl, hydroxy and methylene sulphone ether, Y stands for OH, COOH or lower alkoxy, $R_1$ stands for hydrogen or lower alkyl, $R_2$ stands for lower alkyl, lower alkenyl, lower alkoxy, phenyl, bromomethylphenyl, chloromethyl-phenyl, amino, mono lower alkylamino, di lower alkylamino or phenylamino or the metal complex compounds of said azo dyestuff.

2. The chromium complex or cobalt complex compound of the dyestuff of claim 1 having substantially one atom of chromium or cobalt bound in complex union with two molecules of an azo dyestuff as least one of which being a dyestuff of claim 1.

3. A metal complex dyestuff of claim 1 having one atom of cobalt or chromium bound in complex union with substantially two molecules of a dyestuff of the formula

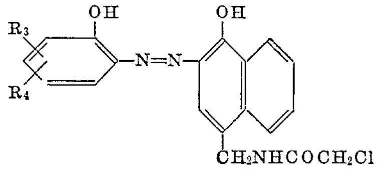

wherein $R_3$ stands for hydrogen, nitro, chloro or $SO_2NH_2$ and $R_4$ stands for hydrogen or nitro.

4. The 1:2 cobalt complex compound of a dyestuff of claim 1 having the formula

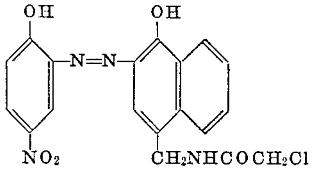

5. The 1:2 cobalt complex compound of a dyestuff of claim 1 having the formula

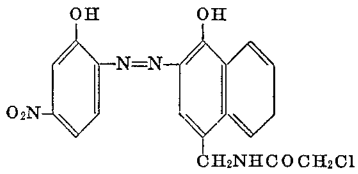

6. The 1:2 cobalt complex compound of a dyestuff of claim 1 having the formula

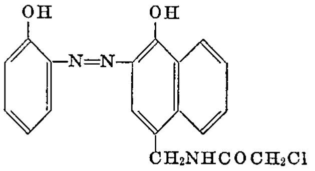

7. The 1:2 cobalt complex compound of a dyestuff of claim 1 having the formula

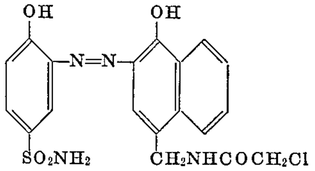

8. The 1:2 cobalt complex compound of a dyestuff of claim 1 having the formula

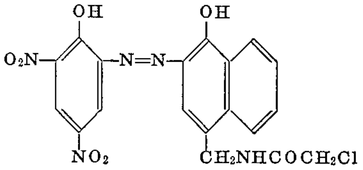

9. The 1:2 chromium complex compound of a dyestuff of claim 1 having the formula

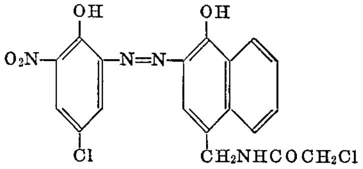

10. The 1:2 chromium complex compound of a dyestuff of claim 1 having the formula

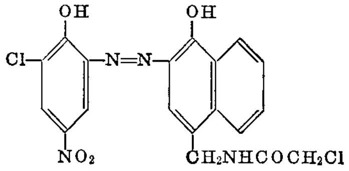

References Cited

UNITED STATES PATENTS

| | | | |
|---|---|---|---|
| 2,173,054 | 9/1939 | Hitch | 260—202 XR |
| 3,114,746 | 12/1963 | Benz et al. | 260—150 XR |
| 3,122,533 | 2/1964 | Senn | 260—150 XR |
| 3,336,284 | 8/1967 | Jager et al. | 260—154 |

FLOYD D. HIGEL, Primary Examiner

U.S. Cl. X.R.

8—41, 42, 43, 46, 47, 71; 260—150, 202, 194, 518, 519